Nov. 26, 1946.    J. L. MICHAELSON    2,411,741
COLOR MATCHING APPARATUS
Filed Dec. 13, 1939
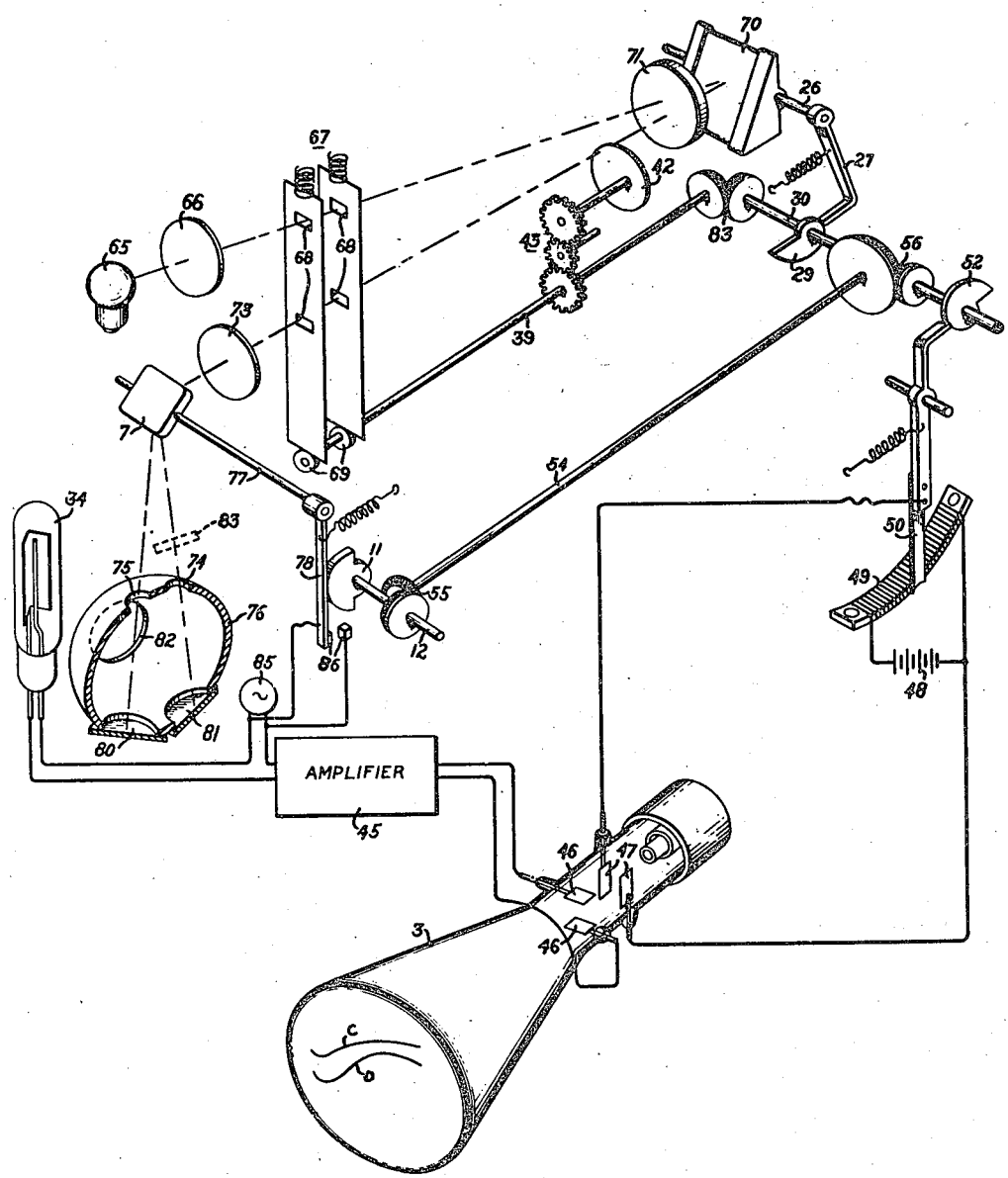
Inventor:
Jesse L. Michaelson,
by Harry E. Dunham
His Attorney.

Patented Nov. 26, 1946

2,411,741

UNITED STATES PATENT OFFICE 2,411,741

COLOR MATCHING APPARATUS

Jesse L. Michaelson, Schenectady, N. Y., assignor to General Electric Company, a corporation of New York Application December 13, 1939, Serial No. 309,013

7 Claims. (Cl. 88—14)

My invention relates to apparatus adapted for use in matching colors and particularly to such apparatus employing photoelectric means.

It is the object of my invention to provide improved color matching apparatus with which one may observe simultaneously the spectrophotometric curves of two objects.

My invention will be better understood from the following description taken in connection with the accompanying drawing, and its scope will be pointed out in the appended claims.

The single figure of the drawing is a perspective view of apparatus adapted for use in producing spectrophotometric curves of light reflected from two surfaces. A single light source is employed which is dispersed into its separate wave lengths and those wave lengths successively projected upon the surfaces of two flat objects which may be termed a sample and a standard, the light reflected therefrom being received by a photoelectric device. The output of that device controls the tracing of the reflectance curves by a cathode ray tube.

The light from the light source or lamp 65 is collected by the lens 66 and illuminates the slit 67 which is for the purpose of providing the desired degree of purity in the monochromatic light beam finally received by the light sensitive member 34. The slit comprises two vertical plates each having two light openings 68 therein. The two plates are moved simultaneously in opposite directions by the cams 69 on the shaft 39, each plate being held against its cam by a spring shown above the plate. The rocking prism 70 has a reflecting rear face whereby monochromatic light is directed back on the slit. Arranged in front of the prism is the lens 71 which renders parallel the rays of light received from the slit 67. On this lens there is formed an image of the filament of the lamp 65. The light reflected by the prism 70 passes again through the lens 71 which images the upper light openings 68 of the slit 67 on the slit in the vicinity of the lower light openings 68 thereof. As the prism is rocked the monochromatic light of the various wave lengths passes the lower openings and is controlled thereby. The prism is mounted on the shaft 26 having the arm 27 which engages the wave length cam 29 on the shaft 30. Between the lens 71 and the slit 67 I have shown the cam 42 for controlling the transmission of the monochromator in such a manner as to give a uniform deflection of the beam of the cathode ray tube 3 over the whole wave length range of the prism 70 when white light is emitted from the light source. The cam 42 is arranged to be rotated through the gearing 43 from the shaft 39 at a 1:1 speed ratio. That part of each monochromatic beam which passes the lower openings 68 passes the lens 73 and is reflected by the rocking mirror 7 into one or the other of the two windows 74 or 75 of the integrating sphere 76 depending upon the position of the mirror. The mirror is shown mounted upon the rock shaft 77 having the arm 78 which engages the flicker cam 11 mounted on the shaft 12. The integrating sphere is provided with two windows opposite the windows 74 and 75 which are adapted to be covered by the objects 80 and 81 which may be considered sample and standard the reflectances of whose surfaces are to be compared. Opposite another window 82 of the sphere is the photoelectric device 34, the arrangement being such that the light received by the device is limited to that transmitted by the window from the interior of the sphere. Coordination of movement of the various movable parts of the apparatus is secured by interconnecting the main or drive shaft 30 with the cam 42 through the gearing 43 and with the cams 69 through the shaft 39 and the 1:1 bevel gears 83. The shaft 30 is also connected with the flicker cam shaft 12 through the shaft 54, the 1:1 bevel gearing 55 and the 1:2 bevel gearing 56.

The output of the photoelectric device 34 after being amplified by the amplifier 45 is applied to the vertical deflection plates 46 of the cathode ray tube 3. The horizontal deflection plates 47 of the tube are connected with the battery 48 through the potentiometer 49 having the oscillating arm 50 controlled by the cam 52 on the shaft 30. During the interval at which the various wave lengths are directed upon the object 80 the cathode ray tube will draw a curve shown for example by C which is the reflectance curve of that object. Likewise, during that interval at which the various wave lengths are directed upon the object 81, the cathode ray tube will draw the curve represented by D which is the reflectance curve of that object. The apparatus is operated at such a speed that the two curves are drawn so rapidly that they appear to the observer as being continuous.

In order that the observer may better be able to distinguish one curve from the other particularly when the curves lie close to each other I may cause one curve to have some distinguishing characteristic, for example one curve may be caused to have short lines projecting therefrom at intervals. For this purpose I have shown at 85 a device for producing small intermittent voltage impulses connected in circuit with the photoelectric device. In order that only one curve may be so marked the arm 78 by which the mirror is rocked is provided with the contacts 86 which during one half of the rotation of the flicker cam 11 are separated and during the other half rotation are in contact and are connected to short circuit the impulse generator 85.

The operation of the apparatus is as follows: During each short interval when the mirror arm 78 is in engagement with that portion of the cam 11 having the larger radius whereby the light beam dispersed and reflected by the prism 70 is reflected by the mirror 7 toward the object 80, the prism is rocked by the cam 29 from one limiting position thereof to the other so that the object receives monochromatic light successively of the various wave lengths of the light emitted by the lamp. This projection of monochromatic light of various wave lengths on the sample is produced by the scanning action of the lower opening 68 in the right-hand plate as a result of the relative motion of the opening and the spectrum which is produced by the rocking of the prism 70. During this interval also the potentiometer arm 50 is moved from one limiting position thereof to the other by the cam 52, the slit 67 is adjusted to produce the desired purity of the monochromatic light reaching the object 80, and the cam 42 is varied. Owing to the 1:2 ratio of the gears 56 between the drive shaft 30 and the shaft 54 and the 1:1 ratio of the gears 55 between shaft 54 and the flicker cam shaft 12, the contact arm 50 is moved back and forth across the potentiometer 49 twice during each complete cycle of operation of the scanning means; once when the arm 78 is in engagement with the high portion of the cam 11 and once when it is in engagement with the low portion. As a result of the varying potential differences applied between the deflecting plates 46 and between the deflecting plates 47 of the cathode ray tube, during the interval in which arm 78 is on the high portion of the cam the beam thereof is caused to trace on the end of the tube the spectrophotometric curve due to the reflectance of the object 80 since the displacement of the beam horizontally is proportional to the movement of prism 70 which changes the wave length and the displacement of the beam vertically is proportional to the various factors comprising the product of the light intensity, monochromator transmission, the response of the photoelectric device, and the characteristics of the voltage amplifier and the cathode ray tube. The curve so traced may, for example, be that represented at C. In like manner while the arm 78 is in engagement with that part of the cam 11 having the smaller radius the light beam is reflected by the mirror 7 on the object 81 while the prism is rocked from one extreme position to the other whereby the curve D is drawn on the end of the cathode ray tube.

From the foregoing it is seen that during a complete cycle of operation of the scanning means light from the scanned spectrum is projected on both specimens, i. e., the sample and the standard and that separate curves representing the reflectance of each specimen appear on the screen of the cathode ray tube. One is able to observe any difference in the form of the reflectance curve of the one object with respect to that of the other object, the moving parts of the apparatus being operated at such a speed that the two curves appear to be continuous.

It is sometimes desirable to observe the spectrophotometric curve of the light transmitted by an object rather than that of the light reflected thereby. In that case I employ identical objects 80 and 81, preferably white, to cover the lower windows of the integrating sphere and in front of one of the windows, either 74 or 75, I arrange the object whose transmission is to be observed. Such an object is represented by dotted lines at 83.

What I claim as new and desire to secure by Letters Patent of the United States is:

1. In combination, a photoelectric device arranged to receive light reflected from a plurality of objects having different reflectance, means for alternately illuminating said objects each for a short interval, means operative during each interval for limiting the illuminating light to a group of adjacent wave lengths and for varying the wave lengths comprising said group through a predetermined range, and means operating synchronously with said wave length varying means and controlled by the output of said photoelectric device for producing a plurality of curves each representing the energy reflected by one of said objects at the various wave lengths.

2. In combination, an integrating sphere having openings for receiving light reflecting materials, a photoelectric device associated with said sphere, a source of light, means for reflecting light therefrom for short intervals alternately on said materials, means for dispersing light from said source and directing the wave lengths of the dispersed light successively on said reflecting means during each of said intervals and a cathode ray tube having deflecting means responsive to the output of said device and to the position of said directing means.

3. A method of comparing a plurality of color specimens which includes the steps of creating a spectrum, passing successive bands of said spectrum first over one of said specimens and then over another of said specimens, impressing the light reflected by said specimens on a photosensitive surface to produce for each specimen an electrical value of a magnitude varying with the magnitude of the wave length of light reflected by said specimen, amplifying said value producing a beam of radiant energy, projecting said beam on a screen to produce a visible trace thereon when the beam and the screen are moved relative to one another, effecting relative movement between said beam and said screen in one direction in response to said amplified value, periodically effecting relative movement between said beam and said screen at an angle to said first direction, and synchronizing said last mentioned movement with the cycle of production of said electrical value, the period of said cycle approximating the period of persistence of vision.

4. An instrument for evaluating color comprising, in combination, means for projecting the spectrum of a light beam, means for supporting a plurality of color specimens, means including a scanning device for projecting first on one of said specimens and then on another successive bands of monochromatic light from said spectrum, a photoelectric device so positioned with respect to said color specimens as to receive therefrom light reflected thereby, whereby there is created by said photoelectric device electrical values of varying magnitudes, the variations of which correspond respectively to the variations of light intensity reflected by said specimens, means for cyclically operating said scanning device, means connected to said photoelectric device for amplifying said values, a screen, electrical means for projecting a beam on said screen to produce a visible trace thereon as the beam and screen move relative to one another, means responsive to said amplified values for effecting relative movement between said beam and said screen in one direction, cyclically operated means for effecting relative movement between said beam and said screen at an angle to said first direction whereby said beam forms visible curves on said screen representative of said electrical values, and means for synchronizing said last-mentioned means with said scanning device operating means, the period of operation of said scanning device operating means and of said cyclically operated means approximating the period of persistence of vision.

5. An instrument for evaluating color comprising, in combination, means for projecting the spectrum of a light beam, means for supporting a plurality of color specimens, means including a scanning device for projecting first on one of said specimens and then on another successive bands of monochromatic light from said spectrum, a photoelectric device so positioned with respect to said color specimens as to receive therefrom light reflected thereby, whereby there is created by said photoelectric device electrical values of varying magnitudes, the variations of which correspond respectively to the variations of light intensity reflected by said specimens, means for cyclically operating said scanning device, means connected to said photoelectric device for amplifying said values, a screen, electrical means for projecting a beam on said screen to produce a visible trace thereon as the beam moves relative to the screen, means responsive to said amplified values for deflecting said beam in one direction, cyclically operated means for deflecting said beam at an angle to said first direction, the frequency of curve producing operation of said last-mentioned means being so related to the frequency of said scanning device operating means that the trace on said screen forms a plurality of superimposed curves equal in number to the number of specimens being evaluated, and means for synchronizing said last-mentioned means with said scanning device operating means.

6. An instrument for evaluating color comprising, in combination, means for projecting the spectrum of a light beam, means for supporting a plurality of color specimens, means including a scanning device for projecting first on one of said specimens and then on another successive bands of monochromatic light from said spectrum, a photoelectric device so positioned with respect to said color specimens as to receive therefrom light reflected thereby, whereby there is created by said photoelectric device electrical values of varying magnitudes, the variations of which correspond respectively to the variations of light intensity reflected by said specimens, means for cyclically operating said scanning device, means connected to said photoelectric device for amplifying said values, a screen, electrical means for projecting a beam on said screen to produce a visible trace thereon as the beam moves relative to the screen, means responsive to said amplified values for deflecting said beam in one direction, cylically operated means for deflecting said beam at an angle to said first direction, the frequency of curve producing operation of said last-mentioned means being a multiple of that of said scanning device operating means equal to the number of specimens being evaluated, whereby the trace on said screen forms a plurality of superimposed curves equal in number to the number of specimens being evaluated, and means for synchronizing said last-mentioned means with said scanning device operating means.

7. An instrument for evaluating color comprising, in combination, means for projecting the spectrum of a light beam, means for supporting a plurality of color specimens, means including a scanning device for projecting first on one of said specimens and then on another successive bands of monochromatic light from said spectrum, a photoelectric device so positioned with respect to said color specimens as to receive therefrom light reflected thereby, whereby there is created by said photoelectric device electrical values of varying magnitudes, the variations of which correspond respectively to the variations of light intensity reflected by said specimens, means for cyclically operating said scanning device, means connected to said photoelectric device for amplifying said values, a screen, electronic means for projecting a beam on said screen to produce a visible trace thereon as the beam moves relative to the screen, a pair of deflecting plates connected to said amplifying means and responsive to said amplified values for deflecting said beam in one direction, cyclically operated means including a second set of deflecting plates associated with said first-mentioned plates and with said electronic beam projecting means for deflecting said beam at an angle to said first direction, and means for synchronizing said last-mentioned means with said scanning device operating means, the period of operation of said scanning device operating means and of said cyclically operated means approximating the period of persistence of vision.

JESSE L. MICHAELSON.